US009864374B2

(12) United States Patent
Hilnbrand et al.

(10) Patent No.: US 9,864,374 B2
(45) Date of Patent: Jan. 9, 2018

(54) REDUNDANT-CONTROLS SYSTEM FOR AN AUTOMATED VEHICLE

(71) Applicant: Delphi Technologies, Inc., Troy, MI (US)

(72) Inventors: Brian R. Hilnbrand, Mountain View, CA (US); Nandita Mangal, Palo Alto, CA (US); Nathan A. Pendleton, San Jose, CA (US); Jonathan L. Wieskamp, Santa Clara, CA (US); Uday Pitambare, Mountain View, CA (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 78 days.

(21) Appl. No.: 15/146,504

(22) Filed: May 4, 2016

(65) Prior Publication Data

US 2017/0322552 A1 Nov. 9, 2017

(51) Int. Cl.
*B60K 28/06* (2006.01)
*G05D 1/00* (2006.01)
(Continued)

(52) U.S. Cl.
CPC ........... *G05D 1/0077* (2013.01); *B60W 40/09* (2013.01); *B60W 2040/0818* (2013.01); *B60W 2040/0881* (2013.01)

(58) Field of Classification Search
None
See application file for complete search history.

(56) References Cited

U.S. PATENT DOCUMENTS 4,921,066 A 5/1990 Conley
5,775,456 A * 7/1998 Reppas ................. B60K 26/02 180/271

(Continued)

FOREIGN PATENT DOCUMENTS

JP 2008-068664 A 3/2008
JP 2008-120271 A 5/2008

*Primary Examiner* — Ryan Rink
(74) *Attorney, Agent, or Firm* — Lawrence D. Hazelton

(57) ABSTRACT

A redundant-controls system suitable for use an automated vehicle includes a primary-control-device, a secondary-control-device, an occupant-detection-device, and a controller. The primary-control-device is installed in a vehicle. The primary-control-device is selectively enabled to allow operation from an operator-seat of the vehicle by an operator of the vehicle to control movement of the vehicle. The secondary-control-device is installed in the vehicle. The secondary-control-device is selectively enabled to allow operation from a passenger-seat of the vehicle by a passenger of the vehicle to control movement of the vehicle. The occupant-detection-device is used to determine an operator-state-of-awareness of the operator and a passenger-state-of-awareness of the passenger. The controller is in communication with the primary-control-device, the secondary-control-device, and the operator-detection-device. The controller is configured to selectively enable the secondary-control-device to override the primary-control-device when the passenger-state-of-awareness indicates greater awareness than the operator-state-of-awareness.

5 Claims, 2 Drawing Sheets

10
12
42
CONTROLLER
14
PRIMARY-CONTROLS
16
18
OPERATOR
44
PROCESSOR
38
28
34
VEHICLE CONTROLS
36
OCCUPANT-DETECTION
OPERATOR-STATE-OF-AWARENESS
STEERING ACCELERATION BRAKES
PASSENGER-STATE-OF-AWARENESS
30
PASSENGER
40
22
26
32
24
SECONDARY-CONTROLS
48
FACIAL-RECOGNITION
AUTHORIZATION-DEVICE
VOICE-RECOGNITION
50
OPERATOR-AUTH.
52
46

(51) Int. Cl.
*B60W 40/09* (2012.01)
*B60W 40/08* (2012.01)

(56) References Cited

U.S. PATENT DOCUMENTS

| | | | | |
|---|---|---|---|---|
| 2005/0030184 | A1* | 2/2005 | Victor | B60K 28/06 340/576 |
| 2011/0210867 | A1* | 9/2011 | Benedikt | G08G 1/01 340/905 |
| 2013/0054090 | A1 | 2/2013 | Shin et al. | |
| 2013/0062935 | A1* | 3/2013 | Cahill | B64C 25/426 303/20 |
| 2013/0179031 | A1 | 7/2013 | Whelan et al. | |
| 2015/0070160 | A1* | 3/2015 | Davidsson | B60W 50/14 340/457 |
| 2015/0120089 | A1* | 4/2015 | Peel | B60T 7/16 701/2 |
| 2015/0253778 | A1* | 9/2015 | Rothoff | G05D 1/0088 701/25 |
| 2016/0027276 | A1* | 1/2016 | Freeck | G08B 21/02 340/576 |
| 2016/0109882 | A1* | 4/2016 | Ouellette | G05D 1/0061 701/3 |

* cited by examiner

REDUNDANT-CONTROLS SYSTEM FOR AN AUTOMATED VEHICLE

TECHNICAL FIELD OF INVENTION

This disclosure generally relates to a redundant-controls system suitable for use an automated vehicle, and more particularly relates to a system that selectively enables a secondary-control-device operable by a passenger to override a primary-control-device operable by an operator when a passenger-state-of-awareness indicates greater awareness by a passenger than an operator-state-of-awareness of an operator.

BACKGROUND OF INVENTION

Instances arise when the operator or driver of a vehicle such as an automobile becomes unable to safely operate the vehicle. For example, the sudden onset of symptoms related to an illness may render the operator incapable of operating the vehicle, and the onset may be so sudden that the operator is unable to safely stop the vehicle.

SUMMARY OF THE INVENTION

In accordance with one embodiment, a redundant-controls system suitable for use an automated vehicle is provided. The system includes a primary-control-device, a secondary-control-device, an occupant-detection-device, and a controller. The primary-control-device is installed in a vehicle. The primary-control-device is selectively enabled to allow operation from an operator-seat of the vehicle by an operator of the vehicle to control movement of the vehicle. The secondary-control-device is installed in the vehicle. The secondary-control-device is selectively enabled to allow operation from a passenger-seat of the vehicle by a passenger of the vehicle to control movement of the vehicle. The occupant-detection-device is used to determine an operator-state-of-awareness of the operator and a passenger-state-of-awareness of the passenger. The controller is in communication with the primary-control-device, the secondary-control-device, and the operator-detection-device. The controller is configured to selectively enable the secondary-control-device to override the primary-control-device when the passenger-state-of-awareness indicates greater awareness than the operator-state-of-awareness.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
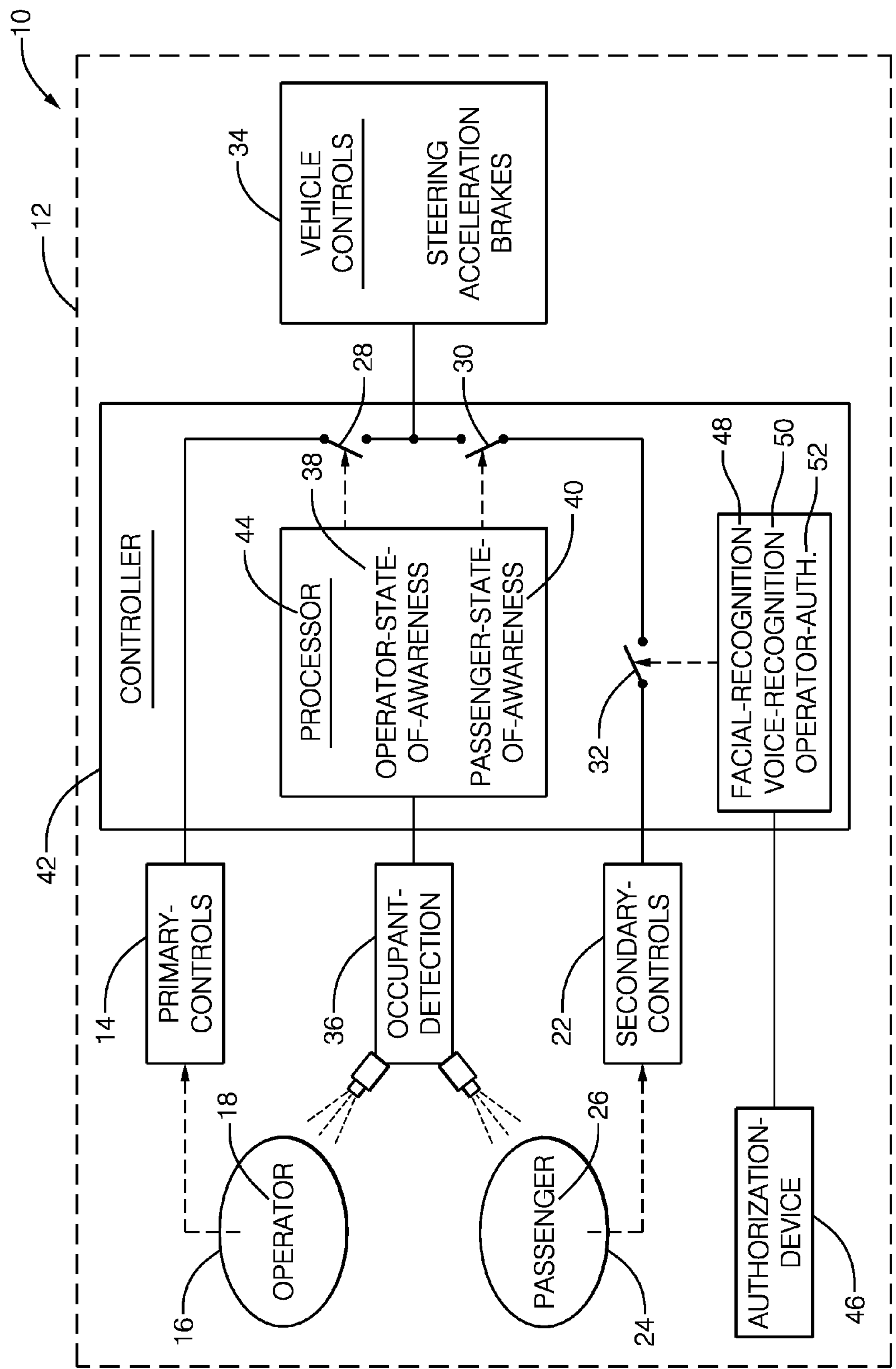
FIG. 1 is a diagram of a redundant-controls system in accordance with one embodiment.

FIG. 1 illustrates a non-limiting example of a redundant-controls system 10, hereafter referred to as the system 10. The system 10 is generally suitable for use an automated vehicle 12, hereafter referred to as the vehicle 12. While the non-limiting examples presented herein are generally directed to situations when the vehicle 12 is being manually operated so the automation aspects of the vehicle 12 are less evident, it is contemplated that the teachings presented herein are applicable to fully-automated or autonomous vehicles where the occupants of the vehicle have little direct control over the movement of the vehicle 12.

Figure 2:
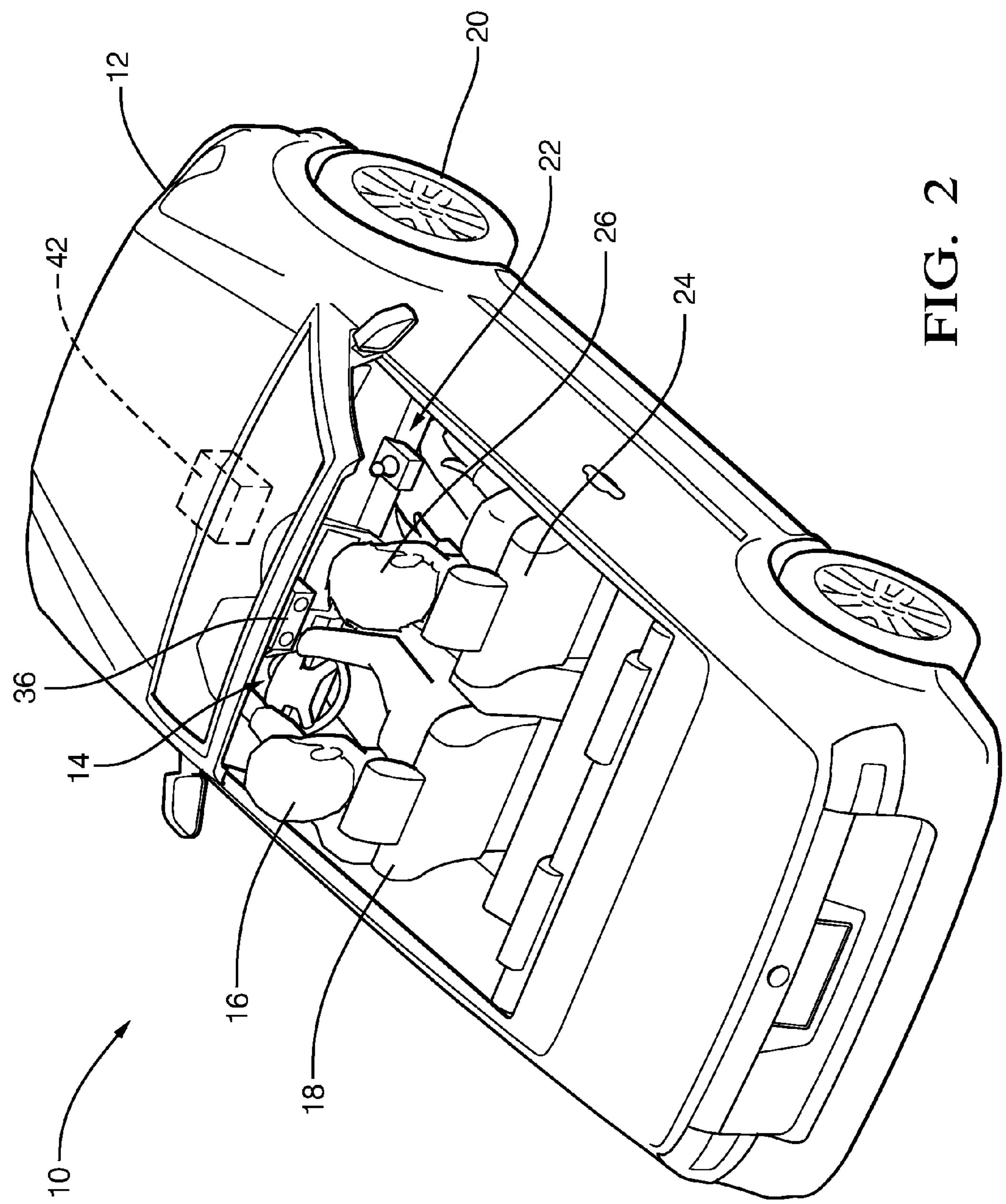
FIG. 2 is a perspective view of a vehicle equipped with the system of FIG. 1 in accordance with one embodiment.

FIG. 2 further illustrates non-limiting details of the vehicle 12 which is equipped with the system 10. The vehicle 12 or the system 10 includes a primary-control-device 14 installed in the vehicle 12. In this example the primary-control-device 14 is the well-known combination of hand-wheel, brake-pedal, and accelerator-pedal. However, it is contemplated that alternatives such as a joystick may be used as the primary-control-device 14. The primary-control-device 14 is generally configured to be selectively enabled to allow operation of the vehicle 12 from an operator-seat 16 of the vehicle 12 by an operator 18 of the vehicle 12 to control movement of the vehicle 12. That is, the primary-control-device 14 is configured so ability of the primary-control-device 14 to control the vehicle 12 may be disabled. For example, the hand-wheel may be decoupled or disconnected or disabled such that turning the hand-wheel has no effect on the angle of the steering-wheels 20 relative to the vehicle 12. Well-known steer-by-wire systems have been proposed that would make disabling the function of the hand-wheel a simple mater. Similarly, brake-by-wire and electronic-throttle-control systems are known and would also make disabling these functions simple.

The system 10 also includes a secondary-control-device 22 installed in the vehicle 12. In this non-limiting example the secondary-control-device 22 is a joystick. However, it is contemplated that the secondary-control-device 22 could also be a duplication of the combination of hand-wheel, brake-pedal, and accelerator-pedal shown for the primary-control-device 14. Like the primary-control-device 14, the secondary-control-device 22 is also generally configured to be selectively enabled to allow operation of the vehicle 12 from a passenger-seat 24 of the vehicle 12 by a passenger 26 of the vehicle 12 to control movement of the vehicle 12. That is, like the primary-control-device 14, the secondary-control-device 22 is configured so ability of the secondary-control-device 22 to control the vehicle 12 may be disabled. FIG. 1 conceptually illustrates the ability of the system 10 to selectively enable and disable the primary-control-device 14 and the secondary-control-device 22 by showing various switches 28, 30, 32 that can be used connect/disconnect the primary-control-device 14 and the secondary-control-device 22 to/from the vehicle-controls 34.

The system 10 also includes an occupant-detector or an occupant-detection-device 36 used to determine an operator-state-of-awareness 38 of the operator 18 and a passenger-state-of-awareness 40 of the passenger 26. By way of example and not limitation, the occupant-detection-device 36 may include one or more cameras configured to capture images of the operator 18 and/or the passenger 26. Those images may be processed using known techniques that, for example, determine an eye-blinking pattern and/or a head-nodding pattern that indicates the alertness of the operator 18 and/or the passenger 26. The operator-state-of-awareness 38 and the passenger-state-of-awareness 40 may also be determined based on other biometric measurements such as respiration-rate, heart-rate, and the like, using ultrasonic-transducers and/or infrared-detectors, as will be recognized by those skilled in the art.

The system 10 also includes a controller 42 in communication with the primary-control-device 14, the secondary-control-device 22, and the operator-detection-device 36. The controller 42 may include a processor 44 such as a microprocessor or other control circuitry such as analog and/or digital control circuitry including an application specific integrated circuit (ASIC) for processing data as should be evident to those in the art. The controller 42 may include memory (not specifically shown), including non-volatile memory, such as electrically erasable programmable read-only memory (EEPROM) for storing one or more routines, thresholds, and captured data. The one or more routines may be executed by the processor 44 to perform steps for determining the operator-state-of-awareness 38 and the passenger-state-of-awareness 40 based on signals received by the controller 42 from the occupant-detection-device 36 as described herein.

The controller 42 is advantageously configured to selectively enable the secondary-control-device 22 to override the primary-control-device 14 when the passenger-state-of-awareness 40 indicates greater awareness than the operator-state-of-awareness 38. That is, if the operator-state-of-awareness 38 suggests that the operator 18 is not capable of safely operating the vehicle 12, control of the vehicle 12 may be given entirely to the passenger by enabling the secondary-control-device 22 and disabling the primary-control-device 14. While the example thus far suggests that it is the authority over manual control of the vehicle 12 that is enabled or disabled based on the states-of-awareness, it is contemplated that the authority to control the vehicle 12 may be merely who (e.g. the operator 18 and/or the passenger 26) in the vehicle 12 authorized to input a voice command such as "drive to the nearest hospital," or "drive home."

As suggested above, the controller 42 or the system 10 may be configured to disable the primary-control-device 14 when the secondary-control-device 22 is enabled. The controller 42 may also be configured to take the reverse action where the secondary-control-device 22 is disabled when the primary-control-device is enabled 14. This may be useful if the operator 18 and the passenger 26 are on a long trip and have agreed to alternate who operates the vehicle 12.

Instances are contemplated when the passenger 26 should not be allowed to operate the vehicle 12 because, for example, the passenger 26 is too young or is blind. As such, the system 10 may include an authorization-device 46 used to determine if or indicate that the operator 18 and/or the passenger 26 is authorized to operate the vehicle 12. By way of example and not limitation, the authorization-device 46 may determine that the passenger 26 is authorized to operate the vehicle 12 based on one of facial-recognition 48 of the passenger 26. That is, the passenger 26 may be allowed to operate the vehicle 12 because the facial-recognition 48 using the occupant-detection-device 36 indicates that the passenger is properly licensed to drive the vehicle 12. Alternatively, voice-recognition 50 of speech by the passenger may be used to determine the identity of the passenger who is pre-authorized to operate the vehicle 12. Alternatively, the operator may input a code to indicate an operator-authorization 52 by the operator 18. If the passenger 26 is not authorized to manually operate the vehicle 12, the system 10 may not enable the manual controls for the passenger 26 to operate the vehicle 12, but may allow the passenger to give voice commands to the vehicle 12 if the operator-state-of-awareness 38 is deem too low to safely operate the vehicle 12 so the primary-control-device 14 should be disabled.

Accordingly, a redundant-controls system (the system 10), a controller 42 for the system 10 and a method of operating the system 10 is provided. The system 10 provides for a variety of ways to hand over control of the vehicle 12 to the passenger 26 if the operator 18 is, for example, too tired or is in medical distress. The system 10 is further configured to determine how much control authority (e.g. manual vs. voice-command-only) is given to the passenger 26 if the operator 18 is not fit to operate the vehicle 12.

While this invention has been described in terms of the preferred embodiments thereof, it is not intended to be so limited, but rather only to the extent set forth in the claims that follow.

We claim:

1. A redundant-controls system suitable for use by an automated vehicle, said system comprising:

a primary-control-device installed in a vehicle, said primary-control-device selectively enabled to allow operation from an operator-seat of the vehicle by an operator of the vehicle to control movement of the vehicle;

a secondary-control-device installed in the vehicle, said secondary-control-device selectively enabled to allow operation from a passenger-seat of the vehicle by a passenger of the vehicle to control movement of the vehicle;

an occupant-detection-device used to determine an operator-state-of-awareness of the operator and a passenger-state-of-awareness of the passenger;

a controller in communication with the primary-control-device, the secondary-control-device, and the operator-detection-device, said controller configured to selectively enable the secondary-control-device to override the primary-control-device when the passenger-state-of-awareness indicates greater awareness than the operator-state-of-awareness.

2. The system in accordance with claim 1, wherein the controller disables the primary-control-device when the secondary-control-device is enabled.

3. The system in accordance with claim 1, wherein the secondary-control-device is disabled when the primary-control-device is enabled.

4. The system in accordance with claim 1, wherein the system includes an authorization-device used to determine that one of the operator and the passenger is authorized to operate the vehicle.

5. The system in accordance with claim 4, wherein the authorization-device determines that the passenger is authorized to operate the vehicle based on one of facial-recognition of the passenger, voice-recognition of the passenger, or operator-authorization by the operator.

* * * * *